United States Patent [19]
Adams et al.

[11] Patent Number: 5,553,815
[45] Date of Patent: Sep. 10, 1996

[54] DE-ICER ADAPTED FOR INSTALLMENT ON THE INNER SURFACE OF A STRUCTURAL MEMBER

[75] Inventors: Lowell J. Adams, Dayton; Norbert A. Weisend, Jr., Cuyahoga Falls; Nathan Pisarski, Stow; Steven C. Simshauser, Akron, all of Ohio

[73] Assignee: The B. F. Goodrich Company, Akron, Ohio

[21] Appl. No.: 224,223

[22] Filed: Apr. 7, 1994

[51] Int. Cl.⁶ .................................................. B64D 15/16
[52] U.S. Cl. ........................ 244/134 R; 381/71; 310/348
[58] Field of Search .......................... 244/134 R, 134 D, 244/134 B; 381/71, 87, 152, 188; 310/348, 359

[56] References Cited

U.S. PATENT DOCUMENTS

| | | | |
|---|---|---|---|
| 2,029,358 | 2/1936 | Clapp | 310/354 |
| 3,178,512 | 4/1965 | Ashword | 381/152 |
| 4,253,704 | 3/1981 | Levin | 299/14 |
| 4,392,027 | 7/1983 | Bock | 381/152 |
| 4,501,398 | 2/1985 | Sandorff | 244/134 R |
| 4,678,144 | 7/1987 | Goehner et al. | 244/134 |
| 4,875,644 | 10/1989 | Adams et al. | 244/134 R |
| 4,982,121 | 1/1991 | Lardiere et al. | 244/134 R |
| 5,129,598 | 7/1992 | Adams et al. | 244/134 D |
| 5,143,325 | 9/1992 | Zieve et al. | 244/134 D |
| 5,152,480 | 10/1992 | Adams et al. | 244/134 D |
| 5,318,253 | 6/1994 | Levin | 244/134 R |

*Primary Examiner*—Galen L. Barefoot
*Attorney, Agent, or Firm*—Kevin L. Leffel

[57] ABSTRACT

A de-icer module especially adapted for installment on the inner surface of an airfoil is provided. The structural member has an outer surface upon which ice accumulates. The de-icer module comprises a support sheet delimited by a support area, a single pancake shaped separation means for developing a transient electro-mechanical separation force between the support sheet and the structural member distributed over the support area, the separation means being adjacent the support sheet, attachment means for connecting the support sheet to the inner surface of the structural member with the support sheet in close proximity to the inner surface of the structural member and the separation means sandwiched between the support sheet and the structural member. The invention provides a simplified mounting arrangement.

50 Claims, 9 Drawing Sheets

DE-ICER ADAPTED FOR INSTALLMENT ON THE INNER SURFACE OF A STRUCTURAL MEMBER

BACKGROUND OF THE INVENTION

1. Field of the Invention

The invention relates to de-icers for aircraft and, more particularly, to de-icers that operate by deforming ice-accumulating surfaces.

2. Description of the Prior Art

The accumulation of ice on aircraft wings and other aircraft structures in flight is a danger that is well known. As used herein, the term "structural members" is intended to refer to any aircraft surface susceptible to icing during flight, including wings, stabilizers, engine inlets, rotors and so forth. Attempts have been made since the earliest days of flight to overcome the problem of ice accumulation. While a variety of techniques have been proposed for removing ice from aircraft during flight, these techniques have had various drawbacks that have stimulated continued research activities.

One approach that has been used extensively is so-called mechanical de-icing. In mechanical de-icing, an ice accumulating surface is distorted in some manner so as to crack ice that has accumulated thereon for dispersal into the airstream. A popular mechanical deicing technique is the use of expandable tube-like structures that are periodically inflatable. The tube-like structures are mounted on the outer surface of the structural member. Inflation of the structures results in their expansion or stretching by 40% or more. Such expansion typically occurs over approximately 2–6 seconds and results in a substantial change in the profile of the de-icer, thereby cracking accumulated ice. Unfortunately, expansion of the devices can negatively influence the airflow passing over the aircraft structure. Also, they are most effective when ice has accumulated to a substantial extent, approximately 0.25 inch or more, thereby limiting their effectiveness. Desirably, ice removal would be accomplished long before accumulations approximating 0.25 inch have accumulated.

De-icers adapted to be attached to an outer surface of a structural member are disclosed in U.S. Pat. No. 4,690,353 to Haslim et al. and U.S. Pat. No. 4,875,644 to Adams et al. In the '353 patent, for example, one or more overlapped flexible ribbon conductors are imbedded in an elastomeric material that is affixed to the outer surface of a structural member. The conductors are fed large current pulses from a power storage unit. The resulting interacting magnetic fields produce an electro-expulsive force that distends the elastomeric member to remove thin layers of ice.

Another mechanical de-icing technique utilizes internal "hammers" to distort the leading edges of aircraft structures. Such an approach is disclosed in U.S. Pat. No. 3,549,964 to Levin et al., wherein electrical pulses from a pulse generator are routed to a coil of a spark-gap pressure transducer disposed adjacent the inner wall of the structural member. The primary current in the coil induces an eddy current in the wall of the structural member and the magnetic fields produced by the currents interact so as to deform the member.

U.S. Pat. Nos. 3,672,610 and 3,779,488 to Levin et al. and U.S. Pat. No. 4,399,967 to Sandorff disclose aircraft de-icers that utilize energized induction coils to vibrate or torque the surface on which ice forms. Each of these devices employs electromagnetic coils or magneto-restrictive vibrators located on the side of the surface opposite to that on which ice accumulates. In U.S. Pat. No. 3,809,341 to Levin et al., flat buses are arranged opposite one another, with one side of each bus being disposed adjacent an inner surface of an ice-collecting wall. An electric current is passed through each bus and the resulting interacting magnetic fields force the buses apart and deform the ice-collecting walls.

Each of the de-icers disclosed by Levin et al. and Sandorff are mounted on a support element, such as a spar associated with the structural member. The special arrangements of conductors, spacers, stringers and/or supports used to mount these de-icers tend to result in undue manufacturing costs, add unwanted weight and render economical and efficient manufacturing procedures difficult to attain.

U.S. Pat. No. 4,678,144 to Goehner et al. is directed toward an electro-impulse de-icing system for an aircraft in which an inductor coil is mounted to an inner surface of an airfoil. As disclosed by Goehner et al., each de-icer includes a ribbon coil spaced from the inner surface of the airfoil by doubler sheets of aluminum. The coil is conformed to the shape of the airfoil surface through use of a block held in place by a support assembly, the support assembly includes a foam layer sandwiched between two layers of fiberglass. The sandwiched foam layer is secured by two brackets, each of which is mounted to the inner surface of the airfoil.

The Goehner et al. mounting arrangement represents an advancement over the above-discussed arrangements of Levin et al. and Sandorff. In contrast to the Levin et al. and Sandorff arrangements, the Goehner et al. coil need not be mounted to a structural support element of the structural member and the coil can be mounted relatively near the inner surface of the structural member. It is believed, nonetheless, that the Goehner et al. mounting arrangement possesses a number of distinct disadvantages.

In particular, the Goehner et al. mounting arrangement is neither convenient nor economical to install since a relatively large group of components must be assembled in order to mount the coil along the inner surface of the airfoil. Moreover, a significant number of these components, such as the coil conforming block, would be unnecessary in a more efficiently designed de-icer.

U.S. Pat. No. 4,253,704 issued to I. A. Levin discloses a method and apparatus for disintegrating a material. A coil is supported by an arm which is attached to a wall by an assembly of angle brackets. A plurality of such assemblies may be distributed along the wall. The individual coil devices are cycled in order to initiate a deflection in the wall which crushes frozen or caked material adjacent the wall. Though simpler in construction than the Goehner device, this mounting arrangement is more complicated than that contemplated by the present invention.

Despite advances taught by the prior art, particularly those advances associated with attachable external de-icers disclosed by U.S. Pat. No. 4,875,644 to Adams et al. and U.S. Pat. No. 4,690,353 to Haslim et al., many installers of de-icers desire de-icing systems in which the coil or conductive layers can be mounted along the inner surface of the structural member. As discussed above, however, many of the prior art systems adapted to be secured along the inner surface of the structural member are neither economical nor convenient to install. It is believed that known de-icing arrangements adapted to be mounted along the inner surface of the structural member fail to appreciate the need for a mounting arrangement that is relatively compact, lightweight and easy to install.

SUMMARY OF THE INVENTION

The present invention overcomes the foregoing drawbacks of the prior art and provides a new and improved de-icer especially adapted for installment on an inner surface of a structural member.

According to an aspect of the invention, a de-icer module is provided especially adapted for installment on an inner surface of a structural member, the structural member having an outer surface upon which ice accumulates, the de-icer module comprising:

a support sheet delimited by a support area;

a single pancake shaped separation means for developing a transient electro-mechanical separation force between the support sheet and the structural member distributed over the support area, the separation means being adjacent the support sheet;

attachment means contiguously extending from the support sheet for attaching the support sheet to the inner surface of the structural member with the support sheet in close proximity to the inner surface of the structural member and the separation means sandwiched between the support sheet and the structural member.

According to another aspect of the invention, a de-icer module is provided especially adapted for attachment to an inner surface of a structural member, the structural member having an outer surface upon which ice accumulates, the de-icer module comprising:

a first support sheet spaced from the inner surface of the structural member;

a second support sheet intermediate the first support sheet and the inner surface of the structural member, the second support sheet being proximate to and spaced from the inner surface of the structural member;

separation means for developing a transient electro-mechanical separation force between the first support sheet and the second support sheet, the separation means being sandwiched between the first and second support sheets; and, attachment means for attaching the first support sheet to the second support sheet and for attaching the second support sheet to the structural member in spaced relationship with the inner surface of the structural member.

According to another aspect of the invention, a de-icer module is provided especially adapted for installment on an inner surface of a structural member, the structural member having an outer surface upon which ice accumulates, the de-icer module comprising:

a support sheet delimited by a support area;

a single pancake shaped separation means for developing a transient electro-mechanical separation force between said support sheet and the structural member distributed over said support area, said separation means being adjacent said support sheet, said separation means having a channel extending therethrough with an axis generally aligned with said separation force; and, an attachment member received by said channel that mounts to the inner surface of the structural member and the support sheet with said separation means sandwiched between said support sheet and the structural member.

According to another aspect of the invention, a de-icer is provided, comprising:

a structural member having a centerline, an outer surface upon which ice accumulates, and an inner surface;

at least two de-icer modules according to one of the de-icer module embodiments disclosed above;

one of the two de-icer modules being attached to the structural member on one side of the centerline, the other of the two de-icer modules being attached to the structural member on the other side of the centerline.

According to another aspect of the invention, a de-icer is provided, comprising:

a structural member having a span, an exposed surface upon which ice accumulates and an inner surface;

at least two de-icer modules according to one of the de-icer module embodiments disclosed above;

one of the two de-icer modules being attached to the structural member at a first location along the span, the other of the two de-icer modules being attached to the structural member at a second location along the span spaced from the first location.

One advantage of the invention is that it provides a de-icer having a simple, yet effective, design. Component requirements are minimized without any degradation in de-icing capacity. Moreover, costs and procedure associated with installation are reduced considerably. Finally, the de-icer's simple design promotes compactness and durability.

Another advantage of the invention is that it can be used effectively with either an electro-impulse de-icer (EIDI) embodiment or an electro-expulsive separation system (EESS) embodiment. That is, the de-icer uses a force-generating element that can include a coil/target arrangement or coil/coil arrangement. Moreover, the invention contemplates use of a prefabricated, modular de-icer which minimizes installation time.

Another advantage of the invention is that it provides de-icer modules that are designed to be highly functional in numerous respects. First, the de-icer modules of the present invention are lightweight, and hence are highly desirable for use in all types of aircraft. Second, the separation means is capable of being disposed in surface-to-surface contact with the structural member to maximize forces applied to the structural member. Finally, a displacement void can be provided between the separation means and the structural member for enhancing impact between the two.

The foregoing, and other features and advantages of the present invention, are illustrated in the accompanying drawings and are described in more detail in the specification and claims that follow.

DETAILED DESCRIPTION OF THE INVENTION

The present invention provides a technique especially adapted for de-icing the leading edges of structural members. De-icing is the removal of ice subsequent to its formation upon a leading edge. A leading edge is that portion of a structural member that functions to meet and break an airstream impinging upon the surface of the structural member. Examples of leading edges are the forward portions of wings, stabilizers, struts, nacelles, rotors, and other housings and protrusions first impacted by an airstream.

Figure 1:
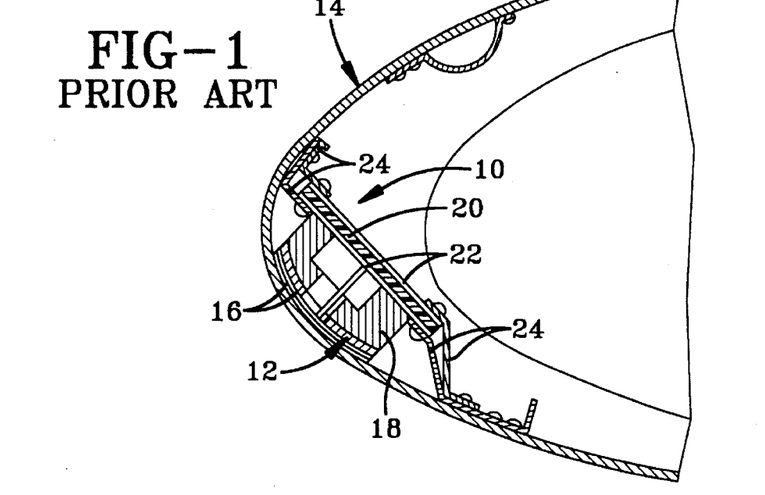
FIG. 1 is a schematic, cross-sectional view of a prior art mechanical de-icer.
Figure 2:
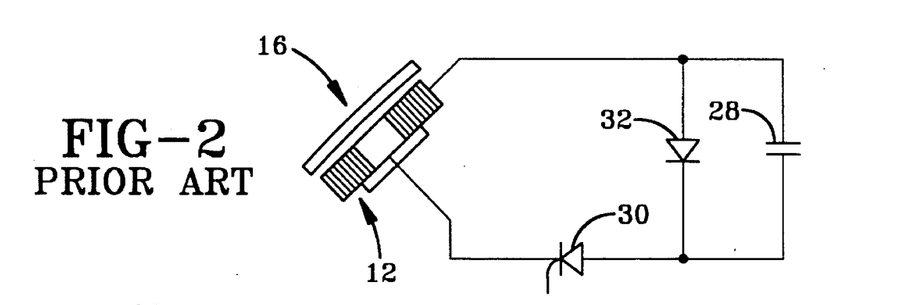
FIG. 2 is a schematic electrical circuit showing how the de-icer of FIG. 1 is activated.
Figure 3:
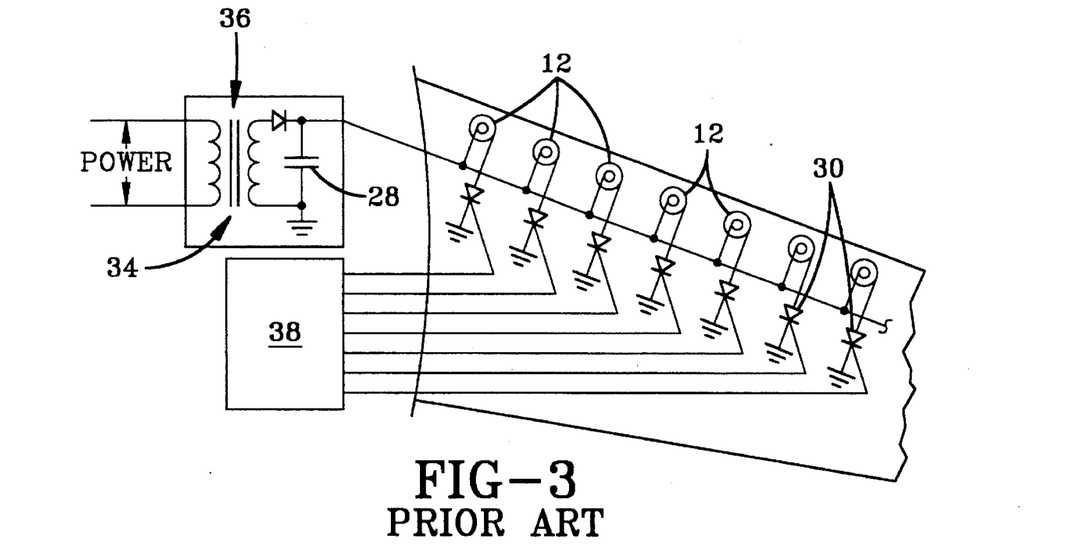
FIG. 3 is a schematic electrical circuit showing how a plurality of de-icers according to FIG. 1 can be installed in a structural member.

FIGS. 1–3 illustrate a known mechanical de-icer 10 and electrical circuitry therefor. The de-icer 10 includes a coil 12 that is disposed along an interior surface of a structural member (such as the leading edge of a wing) 14. Hereinafter, structural member 14 will be referred to as airfoil 14, but as mentioned above, airfoil 14 could assume various forms. The airfoil 14 is typically made of metal, such as aluminum. The coil 12 is spaced from the inner surface of the airfoil 14 by two thin sheets 16 of doubler material and is covered by a block 18. The block 18 is positioned by a foam backing 20, the foam backing being sandwiched between two fiberglass sheets 22. Bracket supports 24 serve to retain backing 20 and fiberglass sheets 22 against airfoil 14 as well as to force block 18 against coil 12 and conform the coil 12 with the shape of the inner surface of airfoil 14. The coil 12 comprises a copper ribbon coil and is circular in plan view.

Referring to FIG. 2, each coil 12 can be energized by a known network in which coil 12 is connected in series with an energy storage capacitor 28 and a thyristor 30. A diode 32 is connected in parallel with the capacitor 28. An electrical impulse is initiated by supplying a trigger pulse to the thyristor 30, allowing the capacitor 28 to discharge through the coil 12. Because the thyristor 30 has diode properties, the current follows the first positive loop of the RLC (resistor-inductor-capacitor) response, after which the thyristor 30 reopens the circuit. This leaves the capacitor 28 reverse-charged. Such reverse-charging reduces capacitor life substantially. For that reason, the diode 32 is placed across the capacitor 28.

Referring to FIG. 3, a typical spanwise installation of the coils 12 within a wing is shown. Each of the coils 12 is separated laterally from other coils 12 by a distance of about 16 inches. The coils 12 are supplied with a single power unit 34 that includes a transformer 36. The capacitor 28 is connected across a secondary side of the transformer 36. A switching device 38 is connected to each of the thyristors 30 in order to provide a trigger pulse to the thyristors 30.

When the capacitor 28 is discharged through each coil 12, a rapidly forming and collapsing electromagnetic field is created that induces eddy currents in the doubler sheets 16 and the metal skin of the airfoil 14. The electromagnetic fields resulting from current flow in the coil 12, the doubler sheets 16, and the skin of the airfoil 14 creates a repulsive force of several hundred pounds magnitude and having a duration of only a fraction of a millisecond. A small amplitude, high acceleration movement of the skin of the airfoil 14 acts to shatter, debond, and expel the ice. Two or three such "hits" are performed in short order, separated by the time required to recharge the capacitor 28. Ice then is permitted to accumulate again until it approaches an undesirable thickness. By appropriate control of the switching device 38, the coils 12 can be activated sequentially in order to create a "ripple" effect that is believed to be more effective in shedding ice due to the propagation of skin movement in both chordwise and spanwise directions.

The mounting arrangement of the de-icer 10 is relatively complex. A count of the parts constituting the de-icer 10, such as rivets, support components, etc., indicates that the de-icer 10 has no less than 14 parts. To mount even a few of de-icers 10 on the inner surface of the airfoil 14 is inevitably a difficult and time-consuming task.

Figure 4:
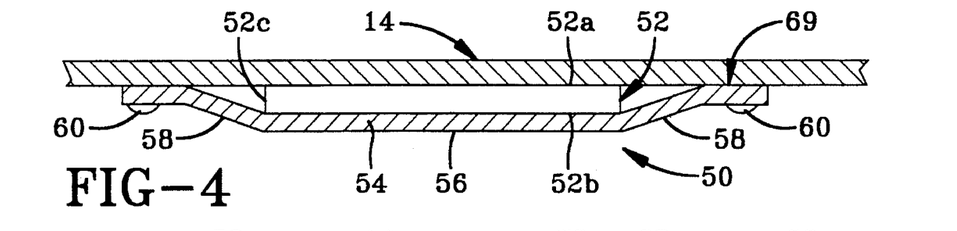
FIG. 4 is a cross-sectional view of a de-icer module according to the invention attached to the inner surface of a structural member.

Referring to FIG. 4, a de-icer module according to the invention is indicated by the reference numeral 50. In the following description, common numerals will be employed when possible to provide an understanding of how the various embodiments of the de-icer module 50 relate to one another. The de-icer module 50 includes a pancake-shaped force generating element or separation means 52 which, in one example, is disposed proximate to an inner surface of an airfoil or structural member 14. The separation means 52 includes sides 52a and 52b as well as a perimeter or edge surface 52c. The airfoil 14 can be manufactured from any suitable metal commonly used for structural members, such as aluminum, titanium or stainless steel. Alternatively, the airfoil 14 can be constructed from composite (reinforced plastic) materials. The separation means 52 is immediately adjacent a support sheet 54, and is maintained in a rest position by the support layer or sheet 54. The support sheet 54 is delimited by a support area 56. Separation means 52 develops a transient electromagnetic separation force between the support sheet 54 and the structural member 14. The separation force is contemporaneously distributed over the support area 56. Therefore, support area 56 closely corresponds to the area of separation means 52 which is defined by perimeter 52c. Attachment means must be provided for connecting the support sheet 54 to the inner surface of the structural member in close proximity to the inner surface of the structural member. In FIG. 4, such attachment means include two ears 58 that contiguously extend from opposing ends of support sheet 54. The ears 58 are secured to the inner surface of airfoil 14 by way of attachment members 60.

Figure 7:
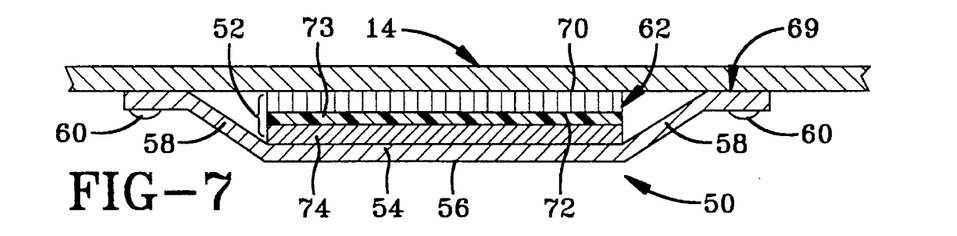
FIG. 7 is similar to the de-icer of FIG. 6 except that the positions of the coil and target with respect to the structural member have been reversed.
Figure 8:
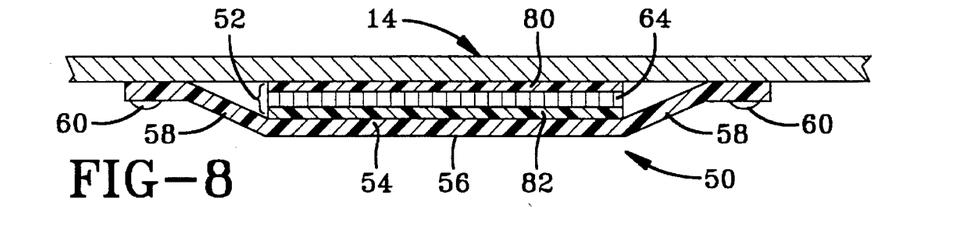
FIG. 8 is a cross-sectional view of a de-icer module according to the invention in which a conductive layer is used in conjunction with the support sheet to implement the separation means.
Figure 9:
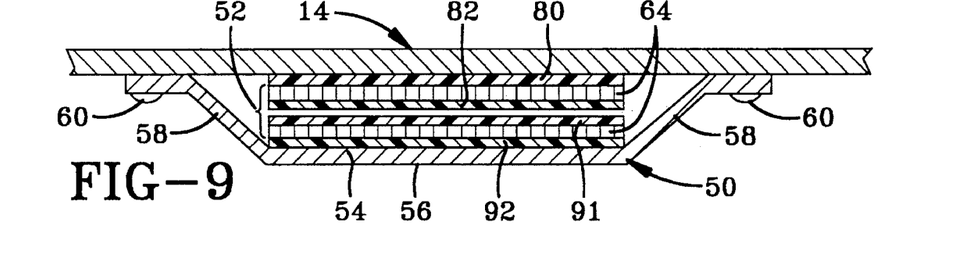
FIG. 9 is a cross-sectional view of the de-icer in which two conductive layers are used to implement the separation means.

As will be discussed in further detail, the type of separation means 52 employed depends on whether the de-icer module 50 is to be an Electro-Impulse De-Icer (EIDI) embodiment or an Electro-Expulsive Separation System (EESS) embodiment. In the EIDI embodiment, separation means 52 comprises a conductive coil 62 (FIGS. 5–7) that generates a transient electromagnetic field upon application of a transient high magnitude current to the coil. The electromagnetic field induces eddy currents in a target portion of the de-icer which create an opposing electromagnetic field. The opposing fields cause the coil and the target portion to forcefully repel each other and separate. In an EESS embodiment, the separation means 52 comprises one or more conductor layers 64 (FIGS. 8–9). Each conductor layer includes an array of conductors arranged such that each conductor layer generates an opposing electromagnetic field upon application of a transient high amplitude current to each layer. The opposing fields cause the layers to forcefully repel each other and separate, as disclosed in U.S. Pat. No. 4,875,644 to Adams et al. entitled "Electro-Repulsive Separation System for De-Icing" which is also incorporated herein by reference. In either the EIDI or EESS embodiment, the separation means 52 preferably utilizes one or more sheet-like planar coils, such as those discussed in U.S. Pat. No. 5,152,480, issued Oct. 6, 1992, entitled "Planar Coil Construction," which is incorporated herein by reference. An EIDI embodiment utilizing a planar coil is particularly preferred.

Figure 5:
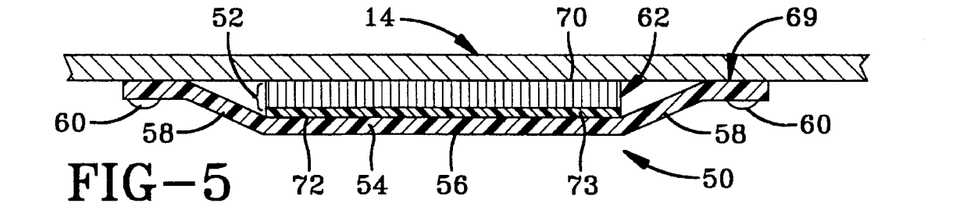
FIG. 5 is a cross-sectional view of a de-icer module according to the invention in which either a support sheet or the structural member serve as a target for a coil.
Figure 6:
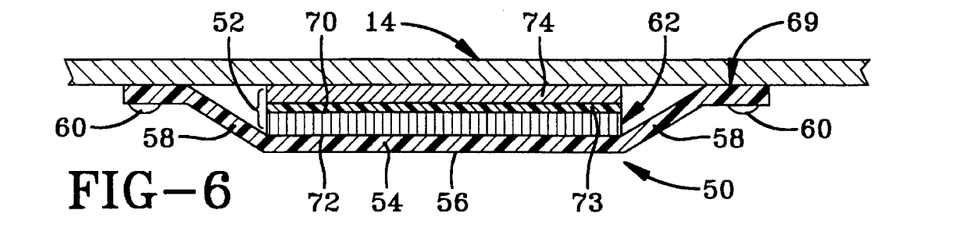
FIG. 6 is a de-icer module according to the invention in which the coil is used in conjunction with a metal target to implement the force-generating element.

The structural and compositional characteristics of the support sheet 54 vary in accordance with a host of factors. The support sheet 54 may be either relatively rigid or relatively resilient and flexible. As discussed in further detail below, the support sheet 54 may be constructed of metal or non-metal materials. In FIGS. 7, 8 and 9 the support sheet 54 is made from metal. In FIGS. 5 and 6 the support sheet 54 is made from fiber reinforced plastic or elastomer. The combination presented in FIGS. 5 through 9 do not cover all the possible combinations anticipated by this invention. Referring to FIGS. 5 through 9, attachment members 60 are rivets which are either attached to the inner surface of the airfoil 14 or secured to an outer surface of airfoil 14 through a counter sinking technique. Other attachment techniques may be employed to secure support layer 54 to the airfoil 14, such as welding, bonding, or the like.

Referring to FIGS. 5 through 7, the separation means 52 utilizes an inductor coil 62 having a "unitary" structure when the de-icer module 50 is an EIDI embodiment. The term "unitary" means that the coil is cohesive and has no portions that move relative to each other. However, coil 62 may be constructed from multiple layers laminated together. For purposes of discussion only, the coil 62 used to implement separation means 52 will be indicated schematically as a single member, as opposed to a multi-layered member. Referring to FIG. 5, the unitary coil 62 includes a first side 70 and a second side 72. At rest, the first side 70 is in direct contact with the airfoil 14, and the second side 72 is in direct contact with the support sheet 56. The coil 62 may or may not be bonded to the inner surface of airfoil 14. The coil can move away from and toward the airfoil 14 if it is not bonded to the airfoil 14. A release layer 73 is used with the deicer module 50 to maintain a separation area between coil 62 and support sheet 54 or airfoil 14. Either the airfoil 14 or the support sheet 54 can be constructed of a metal material to serve as a target for coil 62.

Referring to FIGS. 6 and 7, a metal target 74 may be disposed either intermediate coil 62 and the inner surface of the airfoil 14 (FIG. 6) or intermediate support sheet 54 and the coil 62 (FIG. 7). When using the embodiment of FIG. 6, the support sheet 54 typically will be formed from a composite material (plastic reinforced by fiber or other structural reinforcement material), and when using the embodiment of FIG. 7, the airfoil may be formed from a composite material (fiber reinforced plastic). The target 74 is bonded to the airfoil 14 or support sheet 54 by an adhesive, for example a flexibilized epoxy film adhesive such as catalogue number EA951 manufactured by Hysol Aerospace, Pittsburgh, Calif., U.S.A., a division of Dexter Corporation, while the coil 62 and the metal target 74 are separated by a thin separation ply, or release layer 73. It is expected that the target 74 is made of paramagnetic material such as aluminum. The release layer 73 can be made of a non-stick, thermoplastic material. A suitable material for the release layer 73 is catalogue number A-5000 high elongation FEP release film available from Richmond Aircraft Products, Santa Fe Springs, Calif., U.S.A.

Where the de-icer module 50 is an EESS embodiment, the separation means 52 employs conductor layers, the details of which are discussed in the Electro-Repulsive Separation System Patent. As indicated in the Electro-Repulsive Separation System Patent, it may be desirable to construct each of the conductor layers from two or more superposed conductor arrays. The same is true if planar coils are used. For convenience of illustration, each conductor layer 64 of FIGS. 8 and 9 is shown as a single layer.

Referring to FIG. 8, a first conductor layer 64 is disposed intermediate the inner surface of airfoil 14 and support sheet 54. The second conductor layer is incorporated in support sheet 54 which may be formed from reinforced plastic or elastomer. This arrangement results in a very compact de-icer module 50. A ply 80 of dielectric material, such as rubber or other elastomer, and a sheet-like insulating member, or layer, 82 of dielectric material insulate the first conductor layer 64 from both the airfoil 14 and the support layer 54, respectively. Preferably, the dielectric material is a flexible high-modulus plastic, such as polyamide. A suitable polyamide sheet material is available from E. I. du Pont de Nemours & Company, Wilmington, Del., U.S.A., under the trademark KAPTON®.

Referring to FIG. 9, another example of an EESS embodiment of the present invention is presented. The de-icer module 50 of FIG. 9 is similar to the de-icer module 50 of FIG. 8 except that the second conductor layer 64 is disposed intermediate the support sheet 54 and the first conductor layer 64. Additional layers of dielectric layers 91 and 92 are used to insulate the second conductor layer 64 from both the first conductor layer 64 and the support sheet 54, respectively.

It will be recognized that the approach of the invention is equally appropriate for uses of the de-icer module 50 as an EIDI or with an EESS. That is, de-icing can be achieved whether the separation means 52 is implemented with a coil 62 and a target 74, or with multiple conductor layers 64 (as illustrated in FIGS. 5–9). Hereinafter it will be assumed that EIDI and EESS techniques can be used interchangeably with each embodiment described herein.

Figure 10:
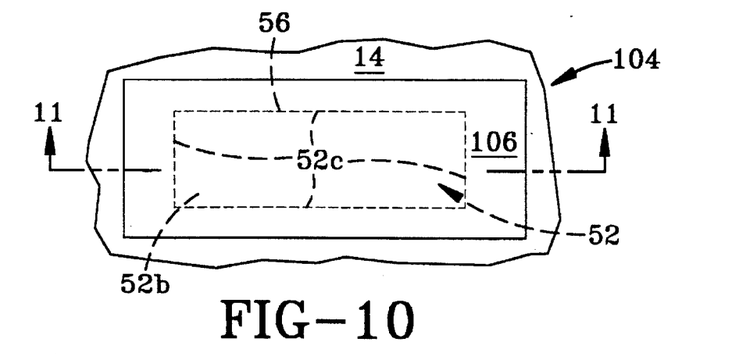
FIG. 10 is a top plan view of another embodiment of a de-icer module according to the invention attached to the inner surface of the structural member.
Figure 11:
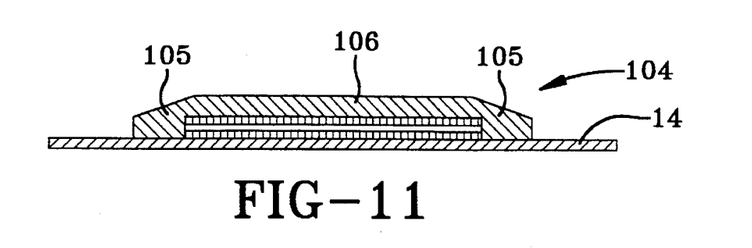
FIG. 11 is a cross-sectional view taken along the plane 11—11 of FIG. 10.

Separation means 52 may be mounted to the inner surface of airfoil 14 by a variety of techniques. Referring to FIGS. 10 and 11, a de-icer module 104, including a lightweight support sheet 106, is shown. Here, the attachment means 105 comprises a contiguous extension of support sheet 106 that extends outside the support area 56 and is bonded to the inner surface of the airfoil 14. In one example, the lightweight support sheet 106 and attachment means 105 may be formed from an elastomeric material dispersed in solvent from which the solvent is subsequently evaporated. A suitable material is catalogue number 1300L rubber cement manufactured by 3M, St. Paul, Minn., U.S.A. More specifically, 2–3 coats of the 1300L rubber cement are applied to construct the support sheet 106 and the height of the support layer 106 is about 0.003–0.005 inch. As will be noted from FIGS. 10 and 11, the second surface 52b and perimeter 52c are securely contacted and supported by the lightweight support sheet 106. The lightweight support sheet 106 and attachment means 105 may also be composed of elastomeric or plastic materials with or without fiber reinforcement. In such cases, the de-icer 104 is attached to the airfoil 14 by an adhesive layer applied outside the support area 56. A rubber cement such as 1300L is particularly useful if the support sheet 106 is composed of a chloroprene rubber compound.

Figure 12:
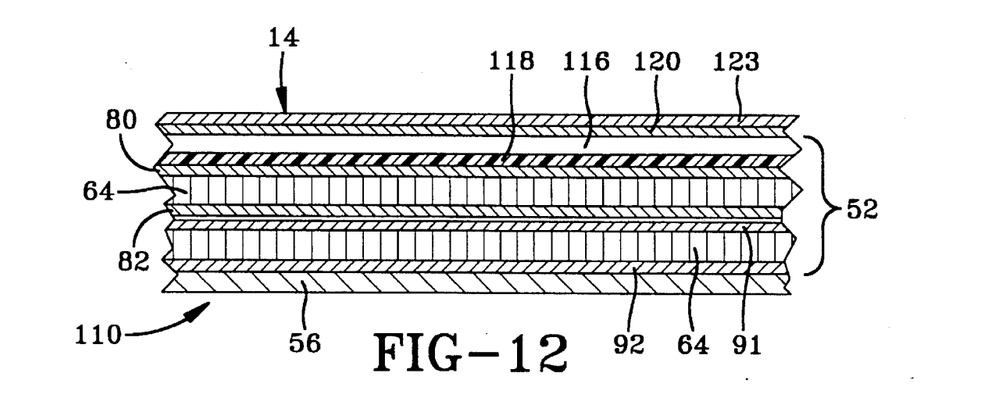
FIG. 12 is a cross-sectional, fragmentary view of an EESS embodiment of a de-icer module having a displacement void according to the invention.
Figure 13:
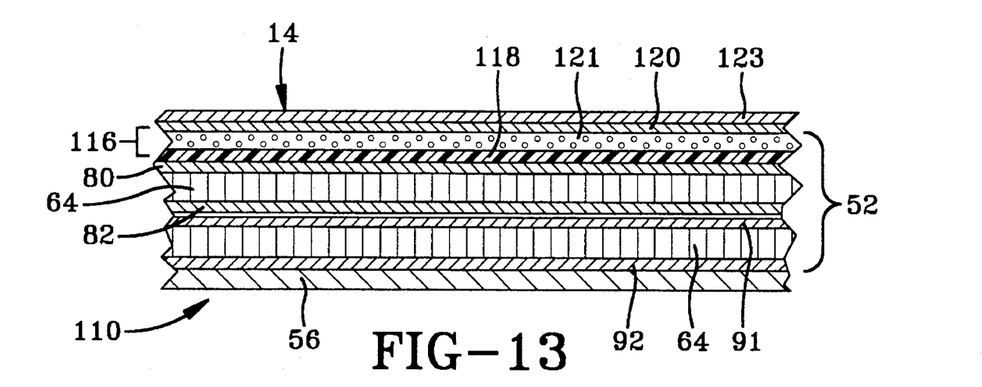
FIG. 13 is a view similar to that of FIG. 12 in which compressible foam is used to fill the displacement void.

An EESS embodiment utilizing a displacement void is presented in FIG. 12. Separation means 52 of FIG. 12 is very similar to the EESS embodiment of FIG. 9 with some minor exceptions relating to structure. The airfoil 14 can be constructed of a formed metal sheet or a thin surface layer 123 bonded to a composite backing 120. This surface layer 123 can be any material with suitable erosion properties such as polyether-ether-ketone or a metallic foil such as aluminum, stainless steel, or titanium. The displacement void 116 is disposed between the ply 80 and the composite backing 120. In another embodiment presented in FIG. 13, the displacement void 116 is filled with a compressible foam 121. Displacement void 116 could also be used in an EIDI embodiment. In such case, the displacement void 116 would be disposed between either the coil and the airfoil or the target and the airfoil, depending on the particular EIDI configuration (for example, see FIGS. 5 through 7).

Figure 14:
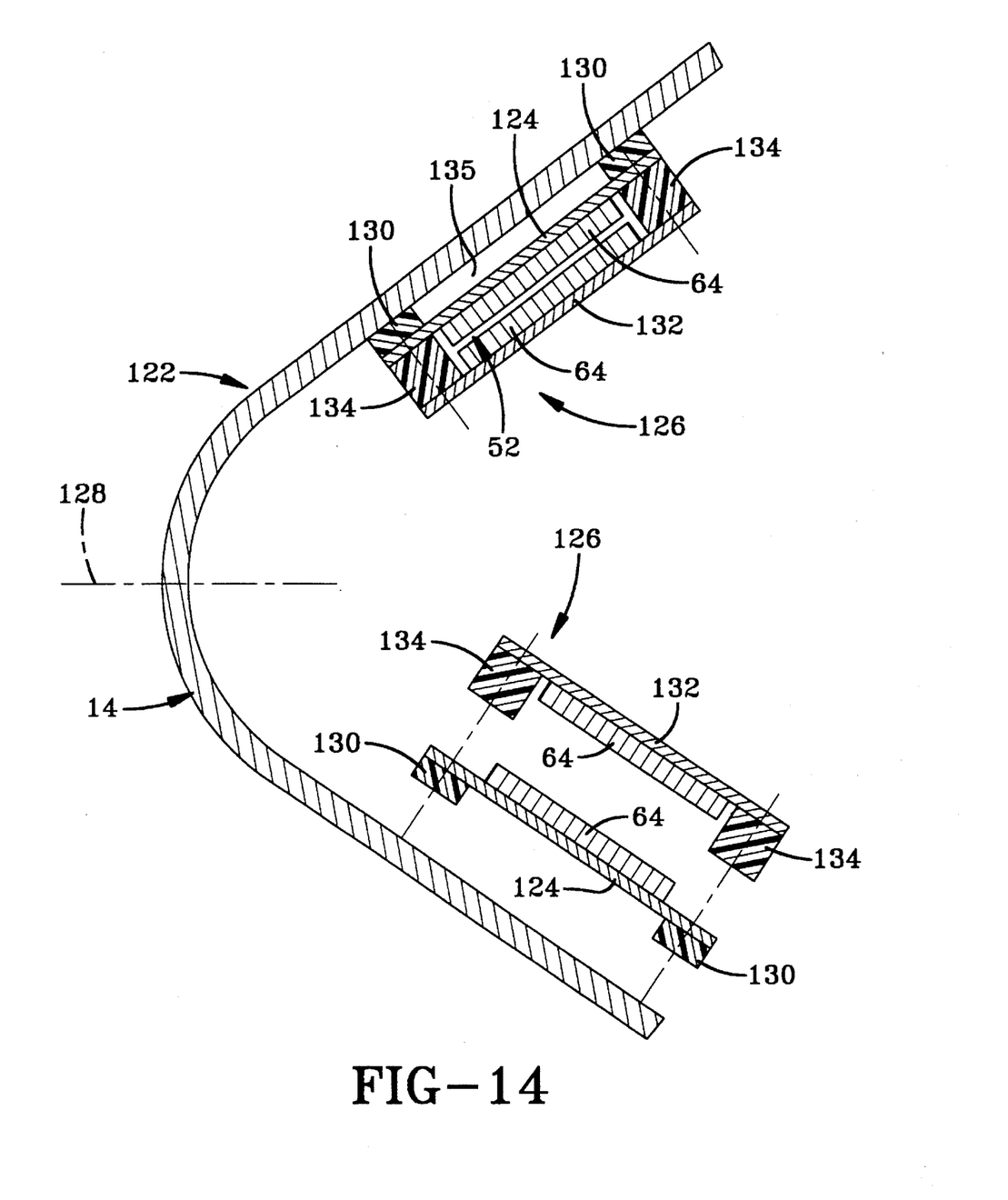
FIG. 14 is a cross-sectional view of a de-icer utilizing two de-icer modules, one of which is partially exploded.

Another embodiment of the invention is presented in FIG. 14. A de-icer 122 comprises structural member or airfoil 14 and two de-icer modules 126 that are mounted to the inner surface of airfoil 14. Airfoil 14 has a centerline 128 with one module 126 being mounted on one side of the centerline and the other module 126 being mounted on the other side of the centerline. Each module 126 includes a first support sheet 132 spaced from the inner surface of the structural member 14. A second support sheet 124 is disposed intermediate the first support sheet and the inner surface of the structural member 14, the second support sheet 124 being proximate to and spaced from the inner surface of the structural member 14. Separation means, here shown as two coils 64, are sandwiched between the first and second support sheets. The separation means generates a separation force between the first and second support sheets 132 and 124.

Attachment means are provided for attaching the first support sheet to the second support sheet and for attaching the second support sheet to the structural member in spaced relationship with the inner surface of the structural member. The attachment means are connected to the first and second support sheets 132 and 134. For de-icer module 126, such attachment means include controlled separation spacers 130 that are mounted between second support sheet 124 and the structural member 14. Conductor layers 64 are sandwiched between the first and second support sheets 132 and 124 with spacers 134 that maintain a spaced relationship. When using de-icer 122 as an EIDI, the coil 62 or the target 74 is substituted for conductor layers 64. The controlled separation spacers 130 and 134 are preferably made of composite material which can be adhesively bonded to the inner surface of airfoil 14 or the support sheets 124 and 132.

The modularity of de-icer 122 serves to provide the de-icer 122 with a design that is both functional and flexible. First, controlled separation spacers 130 serve to define a displacement void 135 when the de-icer 122 is mounted to the inner surface of the airfoil 14. However, the controlled spacers 130 need not be employed in those instances when use of a gap might be undesirable. The spacers 134 form a space in which the force-generating element 52 is mounted as well as acting to separate the conductor layers 64 or coil 62 and the target 74 from each other. As with the EESS de-icers discussed above, backing plies and dielectric layers (not shown) are used to insulate conductor layers 64. Finally, the de-icer 122 can be manufactured as a prefabricated unit for quick and easy installment on the inner surface of airfoil 14.

Figure 15:
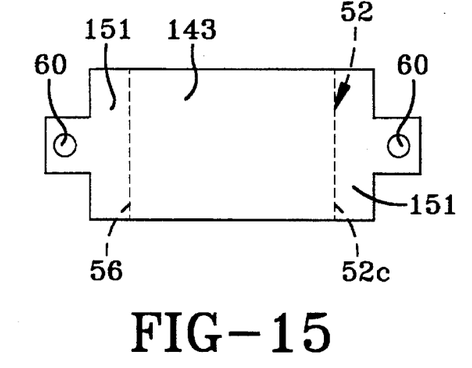
FIG. 15 is a top plan view of a de-icer module according to the invention presenting a two-point attachment means arrangement.

Referring to FIGS. 15–18, various arrangements by which one or more of the separation means 52 may be mounted to the inner surface of airfoil 14, are shown. While the force-generating elements 52 in these figures are in the shape of a square or rectangle, force-generating elements 52 may assume one of many different shapes. Referring to FIG. 15, a two-point mounting arrangement, which is employed to implement de-icer 50, is shown. Two ears 151 contiguously extend from opposite ends of support sheet 143. The separation means perimeter 52c indicates an approximate location of the separation means 52 and the extent of the support area 56. As mentioned above, the two-point mounting arrangement is implemented through use of known mechanical attachment techniques, such as riveting, welding, bonding or the like.

Figures 16, 18:
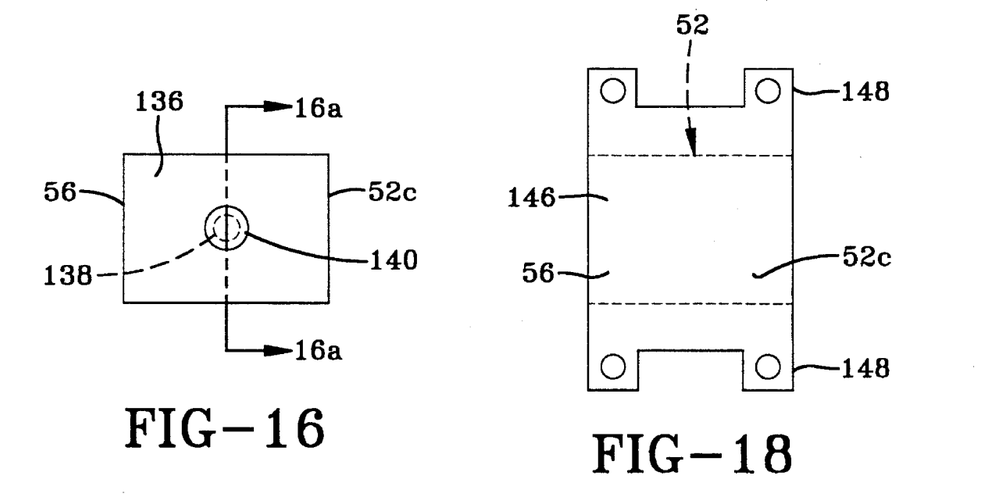
FIG. 16 is a top plan view a de-icer module according to the invention presenting a one point attachment means arrangement.
FIG. 18 is a top plan view of another four-point attachment means arrangement.
Figure 16A:
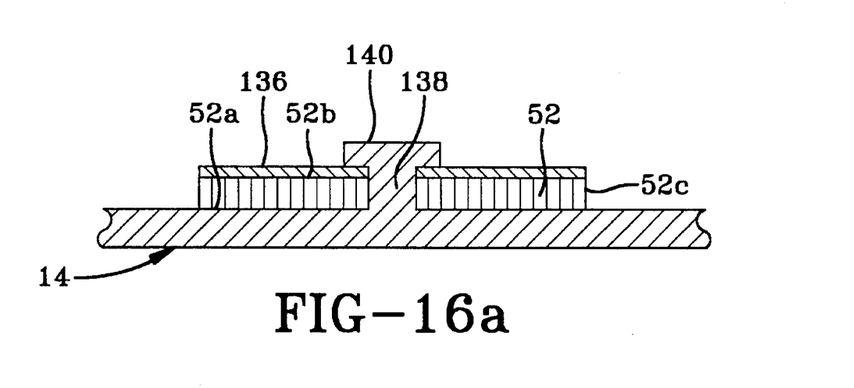
FIG. 16a is a cross-sectional view taken along the plane 16a—16a of FIG. 16.

Referring to FIGS. 16 and 16a, a de-icer module having a single-point mounting arrangement is presented. Here, the attachment means includes an attachment member or shaft 138 that is attached to the inner surface of the airfoil 14 and includes a head portion 140 which serves to fix the support sheet 136 when the separation means 52 is in a rest position. A shaft 138 interconnects the inner surface of the airfoil 14 with the support sheet 136 which is adjacent to and in contact with first side 52a of separation means 52. A channel extends through the separation means. The channel has an axis that is generally aligned with the separation force generated by the separation means. The support sheet could also be formed as an integral part of the separation means.

Figure 17:
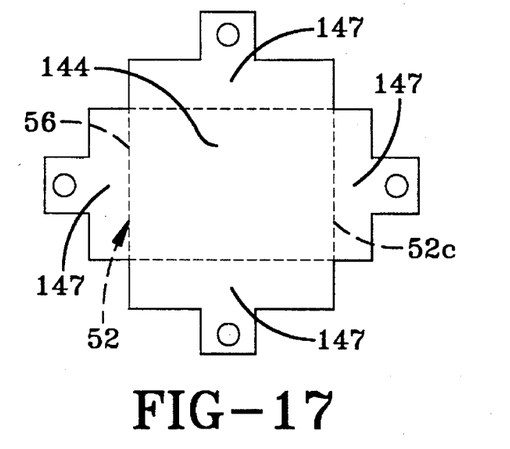
FIG. 17 is a top plan view of a de-icer module according to the invention presenting a four-point attachment means arrangement.

Referring to FIGS. 17 and 18, support sheets 144 and 146 represent four-point mounting arrangements. Four ears 147 contiguously extend from support sheet 144 (FIG. 17). Two of the ears 147 extend from opposite ends of support sheet 144. The remaining two ears 147 extend from opposite ends of support sheet 144 transverse to the first two ears 147. In an alternative four-point support mounting arrangement, two ears contiguously extend from opposite ends of support sheet, and two other ears extend from opposite ends of the support sheet spaced to one side of the first two ears 148. The mounting arrangements of FIG. 15, 17 and 18 can be used with any of the de-icers depicted in FIGS. 4–9 and 14.

Referring to FIGS. 19–26, de-icers having various arrangements of de-icer modules 50 are illustrated. For each of FIGS. 19–26, the de-icer modules 50 are mounted about centerline 150 and each of de-icers 50 is disposed within a partition 152. Each partition 152 is defined by a portion of the centerline 150, one or two edge portions 154, and possibly (but not necessarily) one or two ribs 156. While each of FIGS. 19–26 show arrangements employing eight partitions 152, it should be understood that many more than eight partitions 152 are typically defined along the airfoil 14. In certain preferred embodiments the ribs 156 are not required. Eliminating the ribs 156 may improve performance.

Figure 19:
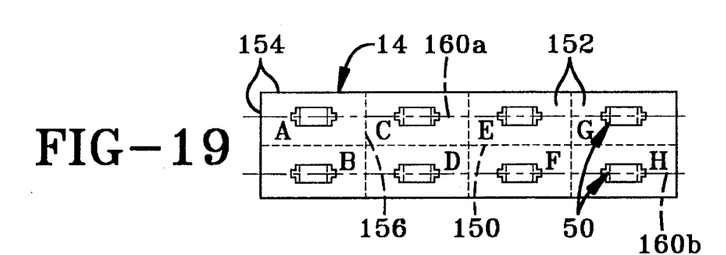
FIG. 19 is a schematic rear elevational view of a de-icer comprising a structural member with a chordwise and spanwise arrangement of multiple de-icer modules according to the invention.
Figure 20:
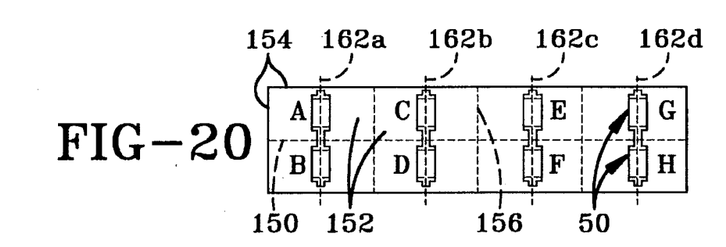
FIG. 20 is a schematic rear elevational view of a de-icer comprising a structural member with a chordwise and spanwise arrangement of multiple de-icer modules according to the invention.

In FIGS. 19 and 20, the de-icer modules are mounted in spanwise and chordwise arrangements. In the embodiments of FIGS. 19 and 20, the de-icer modules 50 should be spaced from about 6 to 24 inches from each other along the span, and roughly equidistant on either side of each rib 156. Spacing could be more than 24 inches in some applications. Additionally, for each partition 152, one of the de-icers 50 is disposed above the centerline 150 and another de-icer 50 is disposed roughly equidistant below the centerline 150. Actual spacing is highly dependent on the application. Pertinent factors include airfoil geometry, material properties of the various components, the required ice removal performance, and available energy to power the separation means. Greater distance between the modules is desirable since it reduces the total number of modules required which reduces weight and energy consumption. However, the distance is limited since ice removal performance generally declines with distance between modules.

Figures 21, 23, 25:
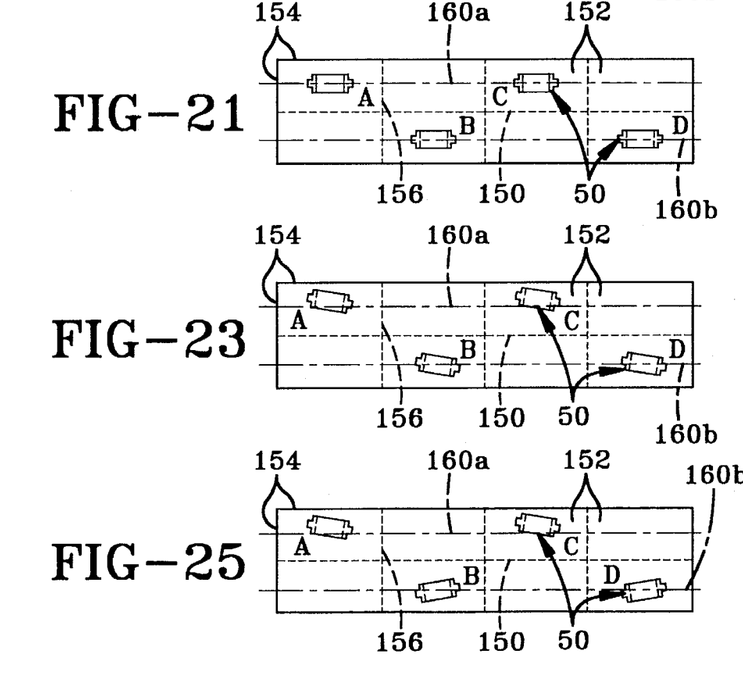
FIG. 21 is a schematic rear elevational view of a de-icer comprising a structural member with a staggered spanwise arrangement of multiple de-icer modules according to the invention.
FIG. 23 presents an alternate embodiment of the FIG. 21 de-icer.
FIG. 25 presents another alternate embodiment of the FIG. 21 de-icer.
Figures 22, 24:
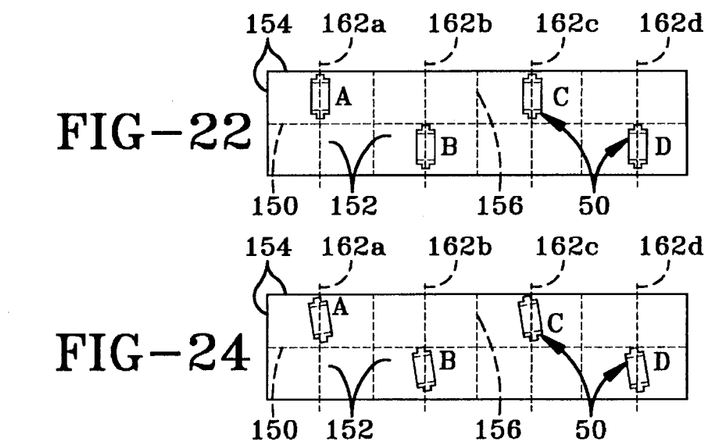
FIG. 22 is a schematic rear elevational view of a de-icer comprising a structural member with a staggered chordwise arrangement of multiple de-icer modules according to the invention.
FIG. 24 presents an alternate embodiment of the FIG. 22 de-icer.
Figure 26:
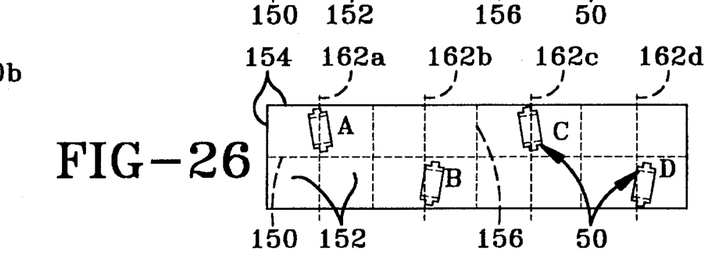
FIG. 26 presents another alternate embodiment of the FIG. 22 de-icer.

In FIGS. 21 and 22, the de-icer modules 50 are mounted in staggered spanwise and staggered chordwise arrangements. As with the exemplary arrangement illustrated in FIGS. 19 and 20, the de-icer modules 50 in FIGS. 21 and 22 are disposed about 6 to 24 inches apart, roughly equidistant on either side of the ribs 156.

The de-icer modules 50 of FIG. 23 are mounted similarly to those of FIG. 21, except that each of the de-icers 50 is rotated clockwise relative to one of the axes 160a and 160b. Each axis 160a and 160b is substantially parallel with the centerline 150. That is, the de-icers 50 of FIG. 23 are mounted in a spanwise diagonal, staggered arrangement.

The de-icer modules 50 of FIG. 24 are mounted similarly to those of FIG. 22 except that each of the de-icer modules 50 is rotated counterclockwise relative to one of axes 162a–162d. Each axis 162a–162d is substantially parallel with one of ribs 156. That is, the de-icer modules 50 of FIG. 24 are mounted in a chordwise diagonal, staggered arrangement.

The de-icer modules 50 of FIG. 25 employ a similar staggering scheme as that used in FIG. 23 except that the de-icer modules 50 disposed below the centerline 150 are rotated counterclockwise, relative to axis 160b rather than clockwise. The de-icer modules 50 of FIG. 26 employ a staggering scheme similar to that used in FIG. 24 except that the de-icers 50 disposed below the centerline 150 are rotated clockwise, relative to axes 162b and 162d, rather than counterclockwise.

As will be appreciated, the above-discussed combinations do not begin to exhaust all of the staggered and non-staggered mounting arrangements that could be employed with the de-icer modules 50. Moreover, any of the above-described de-icers could be employed to implement these mounting arrangements.

Figure 27:
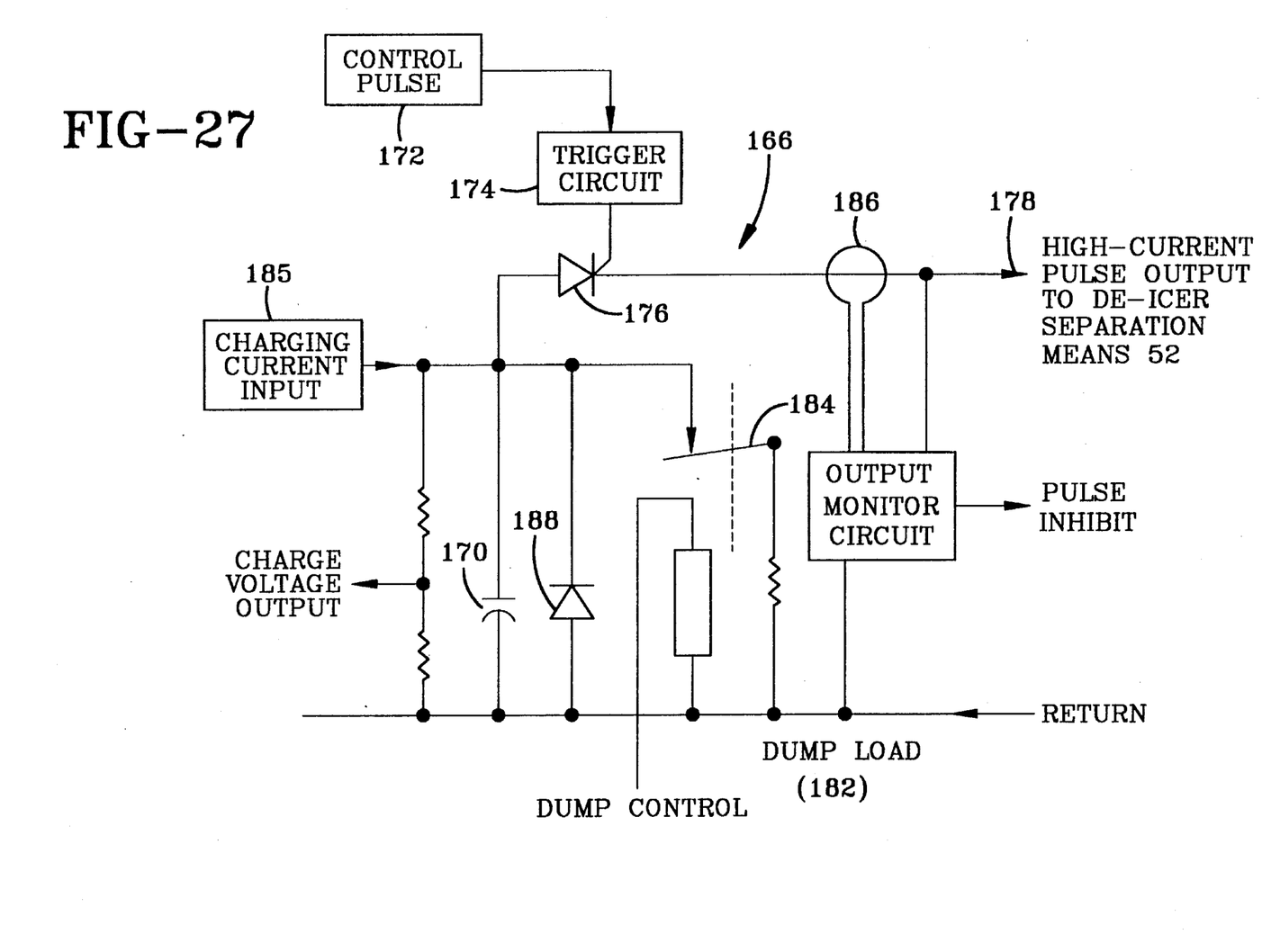
FIG. 27 is a schematic electrical circuit diagram for the de-icers according to the invention.

Referring to FIG. 27, a control circuit for use with the de-icers of the present invention is indicated by the numeral 166. The circuit 166 charges up a bank of capacitors 170 (only one is illustrated for simplicity) which serve as high voltage energy storage devices. When de-icing action is desired, a control pulse 172 is fed to a triggering circuit 174 which enables discharge of the capacitor bank 170 through one or more silicon control rectifiers (SCRs) 176 to provide a high current pulse output 178 to one or more force-generating elements 52.

When an output current pulse 178 is desired, a dump load 182 across the capacitor bank 170, is removed by opening switch 184 thereby allowing charging current from a charging circuit 185 to charge the capacitor energy storage bank 170 to the desired voltage. When the SCR 176 is triggered on, the capacitor bank 170 is discharged, producing the high current pulse, whose current and magnitude is monitored by means of current transformer 186. The voltage of the capacitor bank 170 is communicated to the conductor layers 64, or the coil 62 (not shown in FIG. 27).

Figure 28:
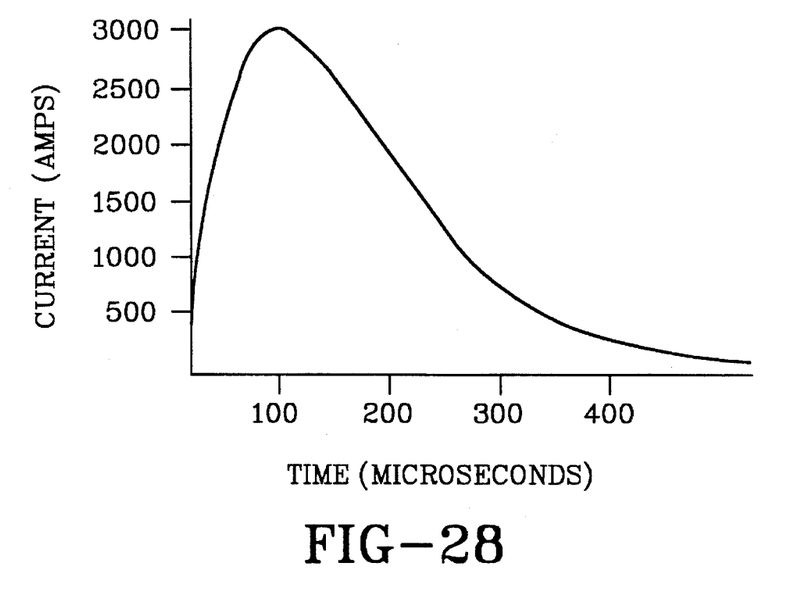
FIG. 28 is a plot of current versus time showing the profile of a current pulse used with the present invention.

Referring to FIG. 28, the current pulse may be a clean, overdamped exponentially decaying sinusoidal waveform that is achieved by setting appropriate RLC values for the control circuit 166 (FIG. 27). In the event that the component values of the control circuit 166 are selected in a known manner, such that the circuit 166 may become underdamped or oscillatory in nature, the circuit 166 should be configured such that a rectifier 188 (FIG. 27) dumps the stored energy of the circuit inductance into the de-icing load, producing a single, non-oscillatory pulse having an extending trailing edge.

Figure 29:
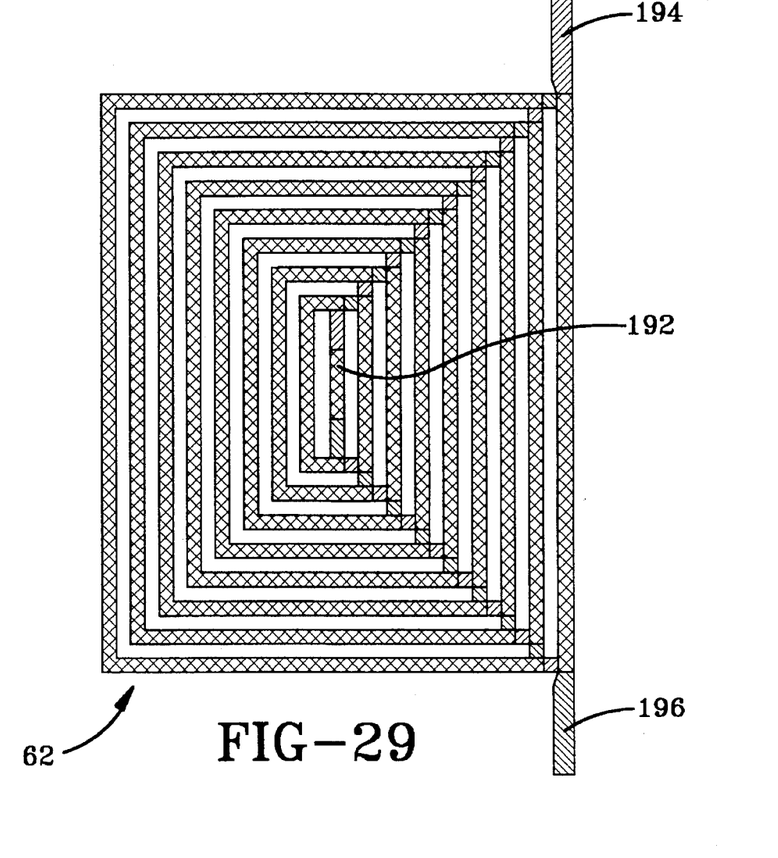
FIG. 29 is a top plan view of superimposed planar coils usable with the present invention.

Referring to FIG. 29, the coil 62 (FIGS. 5–7), which can also serve as one of conductor layers 64 (FIGS. 8–9 and 12–13), is shown in further detail. The composite sheet-like or planar coil 62 of FIG. 29 includes overlapped planar coils which are connected at junction 192. Sheet-like coil 62 can be formed to the shape of the airfoil or structural member. Current flows in one direction from an input 194 to an output 196. A complete discussion of the construction is made available in the Planar Coil Construction Patent.

Figure 30:
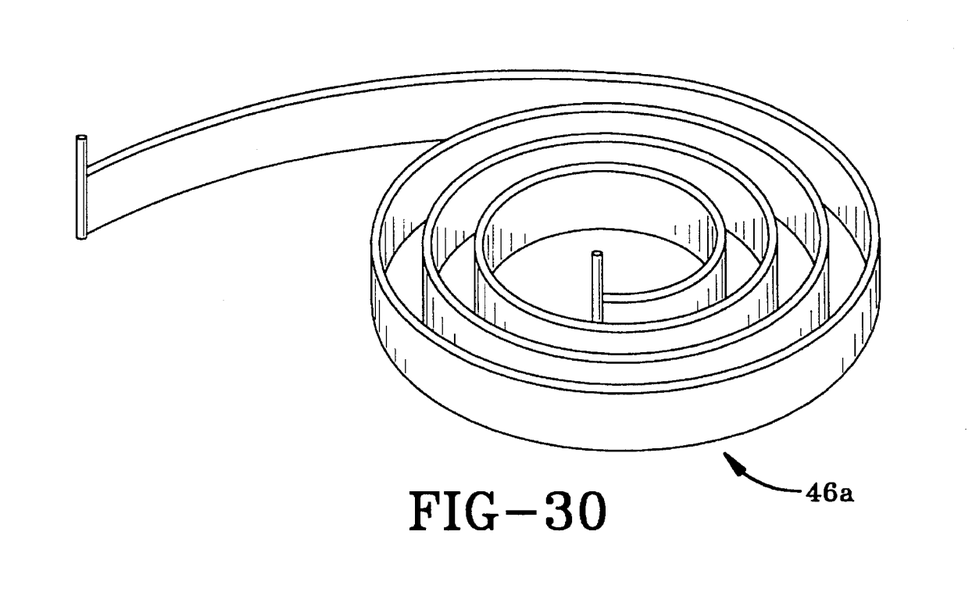
FIG. 30 is a perspective view of a spiralwound coil usable with the present invention.

Referring to FIG. 30, another coil, suitable for use with de-icer 50, is designated by the numeral 46a. A detailed discussion of the coil 46a is made available in U.S. Pat. No. 5,129,598, issued Jul. 14, 1992, entitled "Attachable Electro-Impulse De-Icer". A relatively extensive discussion regarding characteristics of targets in electro-impulse de-icers is provided in the "Attachable Electro-Impulse De-Icer" patent. The discussion generally is directed toward the following concepts:

1) the capability of a coil to induce eddy currents in a target and the capability of the target to sustain the eddy currents;

2) the recommended relationship between the area of the coil and the area of the target;

3) the characteristics of the forces acting on the target;

4) the effect of target design on impulse production; and 5) the effect of matching mechanical and electrical periods on target thickness.

Referring again to FIGS. 4–7, operation of de-icer 50 as an EIDI will be explained in further detail. If the capacitor 170 of FIG. 27 has a capacitance of about 500 microfarads, and if the circuit 166 is operated as described previously, a current flow having a value of about 3000 amps at 1250 volts will be discharged through the coil 62. The rise time of coil 62 will be about 100 microseconds and the decay time will be about 200–300 microseconds. A strong electromagnetic force is generated by the coil 62 and eddy currents are induced in the airfoil 14, the support layer 54 or the metal target 74, depending on which of these three structures is used as the target. In turn, an eddy current electromagnetic field is developed by the airfoil 14, the support layer 54 or the target 74. The electromagnetic field thus generated will create a large repulsive force having a duration of only a fraction of a millisecond.

The repulsive force creates a small-amplitude high-acceleration movement in the airfoil 14, the support layer 54 or the target 74. Referring to FIGS. 5 and 6, the coil 62 is moved away from the airfoil 14. Referring to FIG. 7, the coil 62 moves toward the airfoil 14. If the coil 62 of FIG. 7 were spaced from airfoil 14 by a displacement void, the coil 62 would, upon repulsion from the target 74, impact the inner surface of the airfoil 14 to cause the dislodging of accumulated ice.

Figure 31:
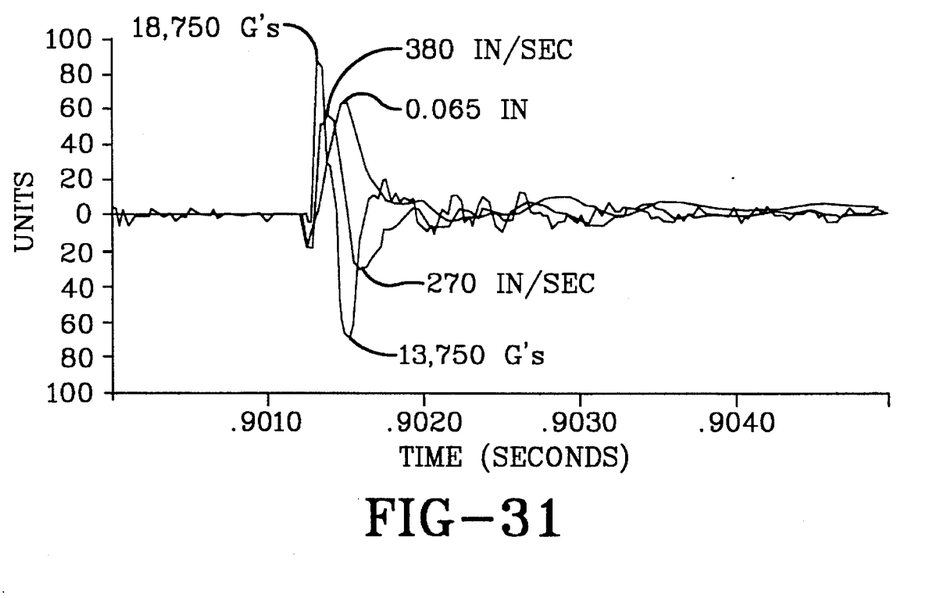
FIG. 31 is a plot of displacement, velocity and acceleration versus time showing the movement of a portion of the de-icer which should be attainable by the invention.

Referring now to FIG. 31, a plot of displacement, velocity and acceleration of a typical EIDI apparatus is presented. As illustrated by FIG. 31, the surface is displaced about 0.065 inch with a peak acceleration of about 18,750 times the acceleration due to gravity (G's) and with a peak velocity of about 380 inches per second. The expansive forces that are generated are reversed during collapse of the electromagnetic fields, thereby producing a retraction wave across the deflected surface. The coil and the deflected surface are rapidly pulled to the initial rest position. As can be seen from an examination of FIG. 31, a peak retraction value is about 270 inches per second, and the peak acceleration is about 13,750 G's. Moreover, there is minimal "bouncing" of the coil 62 and the airfoil 14 as the coil 62 is brought to rest with respect to airfoil 14.

It should be appreciated that use of planar coil 62 as a component of the separation means 52 allows for a highly efficient and economical de-icer which could not heretofore be readily achieved. Moreover, when using the planar coil 62 as an EIDI, it is not necessary to use additional structure, such as a block, to shape the force-generating element 52 for conformity with the inner surface of airfoil 14.

It should be recognized that operation of the separation means 52 in the EESS is, in many respects, similar to the operation of the separation means 52 for the EIDI. That is, as above, current is delivered to the separations means 52 of the EESS (FIGS. 8 and 9), but instead of directing current to the coil 62, the current is directed to conductor layers 64. Moreover, the high current pulse flows in a first direction in one of the conductor layers 64 and in a second direction, substantially opposite to that of the first direction, in the next adjacent conductor layer 64. As explained in the Electro-Repulsive Separation System for De-Icing Patent, this causes conductor layers 64 to be expelled from one another and to be displaced in much the same way that a target and a coil would be displaced from one another in an EIDI arrangement. In effect, each conductor layer behaves as an inductor coil and develops an opposing electromagnetic field. In the present case, upon energizing the conductor layers 64, the first conductor layer 64 presses against or impacts the airfoil 14, and causes ice to be dislodged therefrom.

By incorporating the displacement void 116 of FIG. 12 in the de-icer module 50 construction, the first conductor layer 64 moves a considerable distance before it impacts the inner surface of the airfoil 14. The momentum thus generated provides an enhanced impact force.

Referring again to FIGS. 19–26, exemplary energization patterns for ice removal can now be more fully appreciated. For the sake of convenient discussion, only a maximum of eight de-icers 50, which are labeled A, B, C, D, E, F, G and H, are shown for any given example in FIGS. 19–26. One exemplary energization pattern for ice removal in FIGS. 19 and 20 incorporates sequential application of a large electrical current pulse to the force-generating elements 52 of A–H. A different pattern may be preferable for a particular airfoil structure, such as A, C, E, G . . . and B, D, G, H . . . or A and D, B and C, etc. where longitudinal and torsional forces of predetermined magnitude and pattern are thereby intentionally induced into the coil structure and contribute to effective ice removal.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

We claim:

1. A de-icer module especially adapted for installment on an inner surface of a structural member, the structural member having an outer surface upon which ice accumulates, the de-icer module comprising:

a support sheet delimited by a support area;

a single pancake shaped separation means for developing a transient electro-mechanical separation force between said support sheet and the structural member distributed over said support area to dislodge accumulated ice, said separation means being immediately adjacent said support sheet; and, attachment means contiguously extending from said support sheet for attaching said support sheet to the inner surface of the structural member with the support sheet in close proximity to the inner surface of the structural member and the separation means sandwiched between said support sheet and the structural member.

2. The de-icer module of claim 1, wherein the inner surface of the structural member and said separation means are in contact.

3. The de-icer module of claim 1, wherein the structural member includes a portion made of metal, the support sheet comprises reinforced plastic material, and the metal portion of the structural member is in facing relationship with the separation means.

4. The de-icer module of claim 1, wherein a substantial portion of the structural member is made of a reinforced plastic, and wherein the support sheet is made of metal.

5. The de-icer module of claim 1, wherein the support sheet and separation means have a shape conforming substantially to the shape of the inner surface of the structural member.

6. The de-icer module of claim 1, wherein said attachment means comprises a plurality of ears contiguously extending from the support sheet.

7. The de-icer module of claim 1, wherein said attachment means comprises a first pair of ears contiguously extending from opposite ends of said support sheet.

8. The de-icer module of claim 7, wherein said attachment means further comprises a second pair of ears contiguously extending from opposite ends of said support sheet spaced to one side of said first pair of ears.

9. The de-icer module of claim 7, wherein said attachment means further comprises a second pair of ears contiguously extending from opposite ends of said support sheet transverse to said first pair of ears.

10. The de-icer module of claim 1, wherein the separation means includes an inductor coil.

11. The de-icer module of claim 10, wherein said inductor coil and the inner surface of the structural member are in contact.

12. The de-icer module of claim 10, wherein said inductor coil is a sheet-like coil.

13. The de-icer module of claim 12, wherein said sheet-like coil is formed from multiple layers.

14. The de-icer module of claim 10, further comprising a metal target that is disposed intermediate said inductor coil and the inner surface of the structural member.

15. The de-icer module of claim 14, wherein said target is spaced from the inner surface of the structural member forming a displacement void intermediate said target and the inner surface of the structural member.

16. The de-icer module of claim 10, further comprising a metal target disposed intermediate said inductor coil and said support sheet.

17. The de-icer module of claim 10, wherein said support sheet is comprised of metal.

18. The de-icer module of claim 1, wherein said separation means includes a first conductor layer comprising an array of conductors supported by dielectric material and a second conductor layer comprising an array of conductors supported by dielectric material, said first conductor layer being adjacent said second conductor layer with a separation area in between said first conductor layer and said second conductor layer, said first conductor layer being electrically interconnected with said second conductor layer such that opposing electro-mechanical fields are generated in said first and second conductor layers upon application of a transient current to said first and second conductor layers.

19. The de-icer module of claim 18, wherein said first conductor layer is included as part of said support sheet, and said second conductor layer is disposed intermediate the inner surface of the structural member and said support sheet.

20. The de-icer module of claim 18, wherein said first conductor layer is disposed proximate the inner surface of the structural member with a displacement void intermediate said first conductor layer and the inner surface of the structural member.

21. The de-icer module of claim 20, wherein the displacement void is filled with a compressible material.

22. The de-icer module of claim 18, wherein said first conductor layer comprises a sheet-like coil.

23. The de-icer module of claim 22, wherein said second conductor layer comprises a sheet-like coil.

24. The de-icer module of claim 1, further comprising circuit means for transmitting a short duration, high-current electrical pulse to said separation means.

25. The de-icer module of claim 1, wherein said support sheet includes elastomeric material.

26. The de-icer module of claim 25, wherein said attachment means comprises a contiguous extension of said support sheet extending outside said support area that is adhesively bonded to the inner surface of the structural member.

27. The de-icer module of claim 26, wherein said support sheet is formed from elastomeric material dispersed in solvent solution from which the solvent is evaporated.

28. A de-icer module especially adapted for attachment to an inner surface of a structural member, the structural member having an outer surface upon which ice accumulates, the de-icer module comprising:

a first support sheet spaced from the inner surface of the structural member;

a second support sheet intermediate said first support sheet and the inner surface of the structural member, said second support sheet being proximate to and spaced from the inner surface of the structural member;

separation means for developing a transient electro-mechanical separation force between said first support sheet and said second support sheet, said separation means being sandwiched between said first and second support sheets; and, attachment means for attaching said first support sheet and second support sheet to the structural member, said attachment means being connected to said first support sheet and said second support sheet.

29. The de-icer module of claim 28, wherein said first support sheet includes a portion made of metal and said metal portion is in facing relationship with said separation means.

30. The de-icer module of claim 28, wherein said second support sheet includes a portion made of metal and said metal portion is in facing relationship with said separation means.

31. The de-icer module of claim 28, wherein said separation means includes an inductor coil and a metal target in facing relationship.

32. The de-icer module of claim 28, wherein said inductor coil is a sheet-like coil.

33. The de-icer module of claim 32, wherein said sheet-like coil is formed of multiple layers.

34. The de-icer module of claim 28, wherein said first and second support sheets are comprised of metal.

35. The de-icer module of claim 28, wherein one of said first and second sheets is comprised of metal and the other of said first and second sheets is comprised of reinforced plastic material.

36. The de-icer module of claim 28, wherein said first and second support sheets comprise reinforced plastic material.

37. The de-icer module of claim 28, wherein said separation means includes a first conductor layer comprising an array of conductors supported by dielectric material and a second conductor layer comprising an array of conductors supported by dielectric material, said first conductor layer being adjacent said second conductor layer with a separation area in between said first conductor layer and said second conductor layer, said first conductor layer being electrically interconnected with said second conductor layer such that opposing electro-mechanical fields are generated in said first and second conductor layers upon application of a transient current to said first and second conductor layers.

38. The de-icer module of claim 37, wherein said first conductor layer comprises a sheet-like coil.

39. The de-icer module of claim 37, wherein said second conductor layer comprises a sheet-like coil.

40. The de-icer module of claim 28, further comprising circuit means for transmitting a short duration, high-current electrical pulse to said separation means.

41. A de-icer module especially adapted for installment on an inner surface of a structural member, the structural member having an outer surface upon which ice accumulates, the de-icer module comprising:

a support sheet delimited by a support area;

a single pancake-shaped separation means for developing a transient electro-mechanical separation force between said support sheet and the structural member distributed over said support area to dislodge accumulated ice, said separation means being adjacent said support sheet, said separation means having a channel extending therethrough with an axis generally aligned with said separation force; and, an attachment member received by said channel that mounts to the inner surface of the structural member and the support sheet with said separation means sandwiched between said support sheet and the structural member.

42. A de-icer, comprising:

a structural member having a centerline, an outer surface upon which ice accumulates, and an inner surface;

at least two de-icer modules, each module comprising a support sheet delimited by a support area, a single pancake shaped separation means for developing a transient electro-mechanical separation force between said support sheet and the structural member distributed over said support area to dislodge accumulated ice, said separation means being immediately adjacent said support sheet, and attachment means contiguously extending from said support sheet for attaching said support sheet to the inner surface of the structural member with the support sheet in close proximity to the inner side of the structural member and the separation means sandwiched between said support sheet and the structural member;

one of said two de-icer modules being attached to the structural member on one side of the centerline, the other of said two de-icer modules being attached to the structural member on the other side of the centerline.

43. The de-icer of claim 42, wherein said structural member has a span and one of said two de-icer modules is at a first location along the span, and further comprising a third de-icer module attached to the structural member at a second location along the span spaced from said first location.

44. (once amended) A de-icer, comprising:

a structural member having a span, an exposed surface upon which ice accumulates and an inner surface;

at least two de-icer modules, each module comprising a support sheet delimited by a support area, a single pancake shaped separation means for developing a transient electro-mechanical separation force between said support sheet and the structural member distributed over said support area to dislodge accumulated ice, said separation means being immediately adjacent said support sheet, and attachment means contiguously extending from said support sheet for attaching said support sheet to the inner surface of the structural member with the support sheet in close proximity to the inner side of the structural member and the separation means sandwiched between said support sheet and the structural member;

one of said two de-icer modules being attached to the structural member at a first location along the span, the other of said two de-icer modules being attached to the structural member at a second location along the span spaced from said first location.

45. A de-icer, comprising:

a structural member having a centerline, an outer surface upon which ice accumulates, and an inner surface;

at least two de-icer modules, each module comprising a first support sheet spaced from the inner surface of the structural member, a second support sheet intermediate said first support sheet and the inner surface of the structural member, said second support sheet being proximate to and spaced from the inner surface of the structural member, separation means for developing a transient electro-mechanical separation force between said first support sheet and said second support sheet to dislodge accumulated ice, said separation means being sandwiched between said first and second support sheets, and attachment means for attaching said first support sheet and second support sheet to the structural member, said attachment means being connected to said first support sheet and said second support sheet;

one of said two de-icer modules being attached to the structural member on one side of the centerline, the other of said two de-icer modules being attached to the structural member on the other side of the centerline.

46. The de-icer of claim 45, wherein said structural member has a span and one of said two de-icer modules is at a first location along the span, and further comprising a third de-icer module attached to the structural member at a second location along the span spaced from said first location.

47. A de-icer, comprising:

a structural member having a span, an exposed surface upon which ice accumulates and an inner surface;

at least two de-icer modules, each module comprising a first support sheet spaced from the inner surface of the structural member, a second support sheet intermediate said first support sheet and the inner surface of the structural member, said second support sheet being proximate to and spaced from the inner surface of the structural member, separation means for developing a transient electro-mechanical separation force between said first support sheet and said second support sheet to dislodge accumulated ice, said separation means being sandwiched between said first and second support sheets, and attachment means for attaching said first support sheet and second support sheet to the structural member, said attachment means being connected to said first support sheet and said second support sheet;

one of said two de-icer modules being attached to the structural member at a first location along the span, the other of said two de-icer modules being attached to the structural member at a second location along the span spaced from said first location.

48. A de-icer, comprising:

a structural member having a centerline, an outer surface upon which ice accumulates, and an inner surface;

at least two de-icer modules, each module comprising a support sheet delimited by a support area, a single pancake shaped separation means for developing a transient electro-mechanical separation force between said support sheet and the structural member distributed over said support area to dislodge accumulated ice, said separation means being adjacent said support sheet, said separation means having a channel extending therethrough with an axis generally aligned with said separation force, and an attachment member received by said channel that mounts to the inner surface of the structural member and the support sheet with said separation means sandwiched between said support sheet and the structural member;

one of said two de-icer modules being attached to the structural member on one side of the centerline, the other of said two de-icer modules being attached to the structural member on the other side of the centerline.

49. The de-icer of claim 48, wherein said structural member has a span and one of said two de-icer modules is at a first location along the span, and further comprising a third de-icer module attached to the structural member at a second location along the span spaced from said first location.

50. A de-icer, comprising:

a structural member having a span, an exposed surface upon which ice accumulates and an inner surface;

at least two de-icer modules, each module comprising a support sheet delimited by a support area, a single pancake shaped separation means for developing a transient electro-mechanical separation force between said support sheet and the structural member distributed over said support area to dislodge accumulated ice, said separation means being adjacent said support sheet, said separation means having a channel extending therethrough with an axis generally aligned with said separation force, and an attachment member received by said channel that mounts to the inner surface of the structural member and the support sheet with said separation means sandwiched between said support sheet and the structural member;

one of said two de-icer modules being attached to the structural member at a first location along the span, the other of said two de-icer modules being attached to the structural member at a second location along the span spaced from said first location.

\* \* \* \* \*